(12) United States Patent  (10) Patent No.: US 9,182,879 B2
Larsen et al.  (45) Date of Patent: Nov. 10, 2015

(54) IMMERSIVE INTERACTION MODEL INTERPRETATION

(75) Inventors: Christian Westlye Larsen, Sandnes (NO); Amadeus Wieczorek, Mississauga (CA); Ole Ingemann Kjørmo, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 103 days.

(21) Appl. No.: 13/431,001

(22) Filed: Mar. 27, 2012

(65) Prior Publication Data

US 2012/0254781 A1  Oct. 4, 2012

Related U.S. Application Data

(60) Provisional application No. 61/468,839, filed on Mar. 29, 2011.

(51) Int. Cl.
*G09B 23/40* (2006.01)
*G01V 1/28* (2006.01)
*G01V 1/30* (2006.01)
*G06F 3/0481* (2013.01)
*G06F 9/44* (2006.01)

(52) U.S. Cl.
CPC .............. *G06F 3/0481* (2013.01); *G01V 1/282* (2013.01); *G01V 1/301* (2013.01); *G01V 2210/66* (2013.01); *G06F 9/4443* (2013.01); *G09B 23/40* (2013.01); *Y10T 16/61* (2015.01); *Y10T 16/95* (2015.01); *Y10T 29/49826* (2015.01)

(58) Field of Classification Search
CPC ....... G09B 23/40; G01V 1/282; G01V 1/301; G01V 2210/66; G06F 3/0481; G06F 9/4443
USPC ........ 434/299; 367/68–72; 706/929; 715/765
See application file for complete search history.

(56) References Cited

U.S. PATENT DOCUMENTS

| | | | | |
|---|---|---|---|---|
| 5,530,869 A * | 6/1996 | Salle | ............................... | 717/113 |
| 5,903,270 A * | 5/1999 | Gentry et al. | ................. | 345/419 |
| 6,262,730 B1 * | 7/2001 | Horvitz et al. | ................ | 715/707 |
| 6,369,837 B1 * | 4/2002 | Schirmer | ...................... | 715/764 |
| 7,499,046 B1 * | 3/2009 | Wright et al. | ................. | 345/418 |
| 7,788,594 B1 * | 8/2010 | Tevanian, Jr. | ................. | 715/780 |
| 7,890,499 B1 * | 2/2011 | Boswell | ......................... | 707/722 |
| 2002/0152222 A1 * | 10/2002 | Holbrook | ................... | 707/104.1 |
| 2005/0135662 A1 * | 6/2005 | Vining et al. | ................. | 382/128 |
| 2006/0168522 A1 * | 7/2006 | Bala | ............................. | 715/712 |
| 2006/0238538 A1 * | 10/2006 | Kapler et al. | ................. | 345/440 |
| 2007/0033172 A1 * | 2/2007 | Williams et al. | .................. | 707/3 |
| 2007/0113191 A1 * | 5/2007 | Keller et al. | ................... | 715/752 |
| 2007/0124296 A1 * | 5/2007 | Toebes | ............................. | 707/5 |
| 2007/0185862 A1 * | 8/2007 | Budzik et al. | ..................... | 707/5 |
| 2007/0214425 A1 * | 9/2007 | Bala et al. | ..................... | 715/764 |
| 2007/0285423 A1 * | 12/2007 | Prater | ........................... | 345/426 |
| 2008/0005067 A1 * | 1/2008 | Dumais et al. | .................... | 707/3 |

(Continued)

*Primary Examiner* — Eric J Bycer
(74) *Attorney, Agent, or Firm* — Colin L. Wier; Rodney Warfford; Alec McGinn

(57) ABSTRACT

Embodiments of the present disclosure include one or more of a method, computing device, computer-readable medium, and system for providing an immersive GUI. According to an embodiment, this may include providing a view of G&G data within at least a substantial portion of the GUI, a first GUI element, wherein transparency of the first GUI element varies depending on a location of an input device with respect to the first GUI element, and a second GUI element, wherein the second GUI element is customized based on a context.

22 Claims, 10 Drawing Sheets

(56) References Cited

U.S. PATENT DOCUMENTS

| | | | |
|---|---|---|---|
| 2008/0115082 A1* | 5/2008 | Simmons et al. | 715/804 |
| 2009/0063230 A1* | 3/2009 | Broussard et al. | 705/7 |
| 2009/0132170 A1* | 5/2009 | Krueger et al. | 702/16 |
| 2009/0225089 A1* | 9/2009 | Schreyer et al. | 345/506 |
| 2009/0292475 A1* | 11/2009 | Alam et al. | 702/14 |
| 2009/0319507 A1* | 12/2009 | Chen et al. | 707/5 |
| 2010/0070484 A1* | 3/2010 | Kraft et al. | 707/706 |
| 2010/0103318 A1* | 4/2010 | Wang et al. | 348/565 |
| 2010/0162165 A1* | 6/2010 | Addala et al. | 715/810 |
| 2010/0229110 A1* | 9/2010 | Rockey et al. | 715/760 |
| 2010/0302245 A1* | 12/2010 | Best | 345/426 |
| 2011/0191316 A1* | 8/2011 | Lai et al. | 707/706 |
| 2012/0143879 A1* | 6/2012 | Stoitsev | 707/749 |

* cited by examiner

IMMERSIVE INTERACTION MODEL INTERPRETATION

CROSS-REFERENCE TO RELATED APPLICATION

This application claims the benefit of U.S. Provisional Patent Application 61/468,839 filed Mar. 29, 2011 entitled "Immersive Interaction Model Interpretation" the entirety of which is incorporated by reference herein.

BACKGROUND

Some "Geology and/or Geophysics" (G&G) applications provide a "full-screen mode," which enables data views to use the entire screen to view the data. However, there are no examples in the prior art of a G&G application that allows a user to perform operations on the data and view the results of the operation on the data without switching back and forth between the full-screen and non-full-screen mode. This can be a tedious way of working, and can significantly reduce the value of a full-screen mode because it could draw a user's attention away from visualization of the data.

One purpose of a G&G software application is to allow users to visualize, manipulate, and/or perform operations on G&G data. As an example, a G&G application running on a workstation may include a graphical user interface (GUI). The GUI may include one or more graphical data views coupled with support controls (e.g., toolbars, data trees and operation trees). The support controls may provide a way of performing operations on the data and selecting data to display in a data view.

FIG. 1 shows an example of a GUI 100 provided by the PETREL® software application, which is a product of Schlumberger (PETREL®). The GUI 100 may include a data view 110, and one or more support control 120a-f which surround the data views.

The support controls 120a-f may include one or more GUI elements that enable a user to activate functionality provided by the G&G application. The support controls 120a-f shown in GUI 100 are merely examples—other support controls are also possible. The GUI 100 may be referred to herein as a "non-immersive" GUI.

As shown in FIG. 1, the data view 110 of the non-immersive GUI occupy only a portion of the computer screen due to the presence of the support controls 120a-f. A non-immersive GUI can present one or more of the following disadvantages:

1. The support controls 120a-f occupy an increasing amount of screen space, which may direct user attention away from the data view 110. In certain use cases, the data view 110 is the most important part of the application.

2. The support controls 120a-f may be complicated with respect to navigation because of the number of buttons and options. This could increase the risk of the user acquiring repetitive strain injury (RSI) due to increased mouse usage. For example, these interfaces might involve a large number of mouse clicks to perform certain operations. Advanced workflows can further increase the risk of RSI, because advanced workflows may require adding more support controls 120a-f to the GUI 100.

3. A non-immersive GUI 100 might not be optimized for touch-screen based technologies. For example, the screen space allocated for each support control 120a-f may be comparatively small when reproduced on a touch-device. This may make it difficult to activate certain buttons (e.g., via touch). In addition, with a touch-based interface, the user's hand may block visibility of the data view 110.

4. A non-immersive GUI 100 might implement "non-interactive workflows," wherein the GUI 100 requires the user to manually trigger a data view 110 update when, for example, the user changes one or more parameters related to an algorithm performing a computation over the data. This can lead to decreased user productivity.

5. A non-immersive GUI 100 might use support controls 120a-f, such as non-transparent and/or "heavy-weight dialogs" for interactive workflows. Such non-transparent and/or "heavy-weight dialogs" support controls 120a-f could block users' views of the data view 110. The term "heavy-weight dialog" may refer to a dialog in which the data view is not automatically updated after changes are made (i.e., the user has to manually trigger an event to update the view, for instance, by pressing an "Apply" button or something similar).

6. A non-immersive GUI 100 might not differentiate between operations which are frequently performed versus operations which are seldom used. In addition, a non-immersive GUI 100 might use limited assumptions (e.g., no assumptions) as to what a user needs at a particular step in a workflow. Since no context information about what the user is used, or is being used in a limited way, a non-immersive GUI 100 might need to show all options at all times. This can lead to a complicated GUI 100.

Accordingly there is a need for an immersive interface which allows the user to work more efficiently by using as much screen estate as possible to show data, and thereby avoid blocking the data views as much as possible. Such an immersive interface may have a simple and intuitive interface which is far smarter than traditional interfaces about how the user works, thereby using interactive workflows to the largest extent possible, and supporting new touch-screen technologies.

SUMMARY

According to an example embodiment, a method, computing device, computer-readable media, and system for providing an immersive GUI may provide a view of G&G data within at least a substantial portion of the GUI, a first GUI element, wherein transparency of the first GUI element varies depending on a location of an input device with respect to the first GUI element, and a second GUI element, wherein the second GUI is customized based on a context.

An immersive GUI may also provide a third GUI element for searching a plurality of commands available from the GUI, wherein the third GUI element prioritizes a search result based upon the context.

In another embodiment, an immersive GUI may provide a third GUI element for controlling a light source with respect to the G&G data.

According to an embodiment, the second GUI element of an immersive GUI may comprise a list of attribute calculations, and the immersive GUI may further allow applying a selected attribute calculation from the list of the attribute calculations to the G&G data immediately after a user selects an attribute.

In another example embodiment, an immersive GUI may further comprise a third GUI element for modifying a parameter in response to selection of an attribute to be applied to the G&G data, and may enable applying the parameter to at least a portion of the G&G data immediately in response to user input to the third GUI element.

An immersive GUI may provide a third GUI element for selecting an attribute to be applied to at least a portion of the G&G data, and may enable adding a first attribute selected by the user to an attribute stack comprising a second attribute; and applying the first and second attributes to at least a portion of the G&G data immediately after the user selects the attribute.

The graphical view of G&G data may comprises a three-dimensional view of the G&G data and a two-dimensional view of the G&G data, and the GUI may further allow providing a third GUI element for tracking a horizon related to the G&G data; and switching focus between the three-dimensional view and the two-dimensional view.

In an example immersive GUI, transparency of the first GUI element decreases when the location of the input device is within a boundary of the first element, and transparency of the first GUI element increases when the location of the input is outside the boundary of the first element.

In yet another example embodiment of an immersive GUI, the GUI may allow blurring at least a portion of the view when the location of the input device is within a boundary of the first element.

BRIEF DESCRIPTION OF THE DRAWINGS

Implementations of various technologies will hereafter be described with reference to the accompanying drawings. It should be understood, however, that the accompanying drawings illustrate the various implementations described herein and are not meant to limit the scope of various technologies described herein.

DETAILED DESCRIPTION

Figure 1:
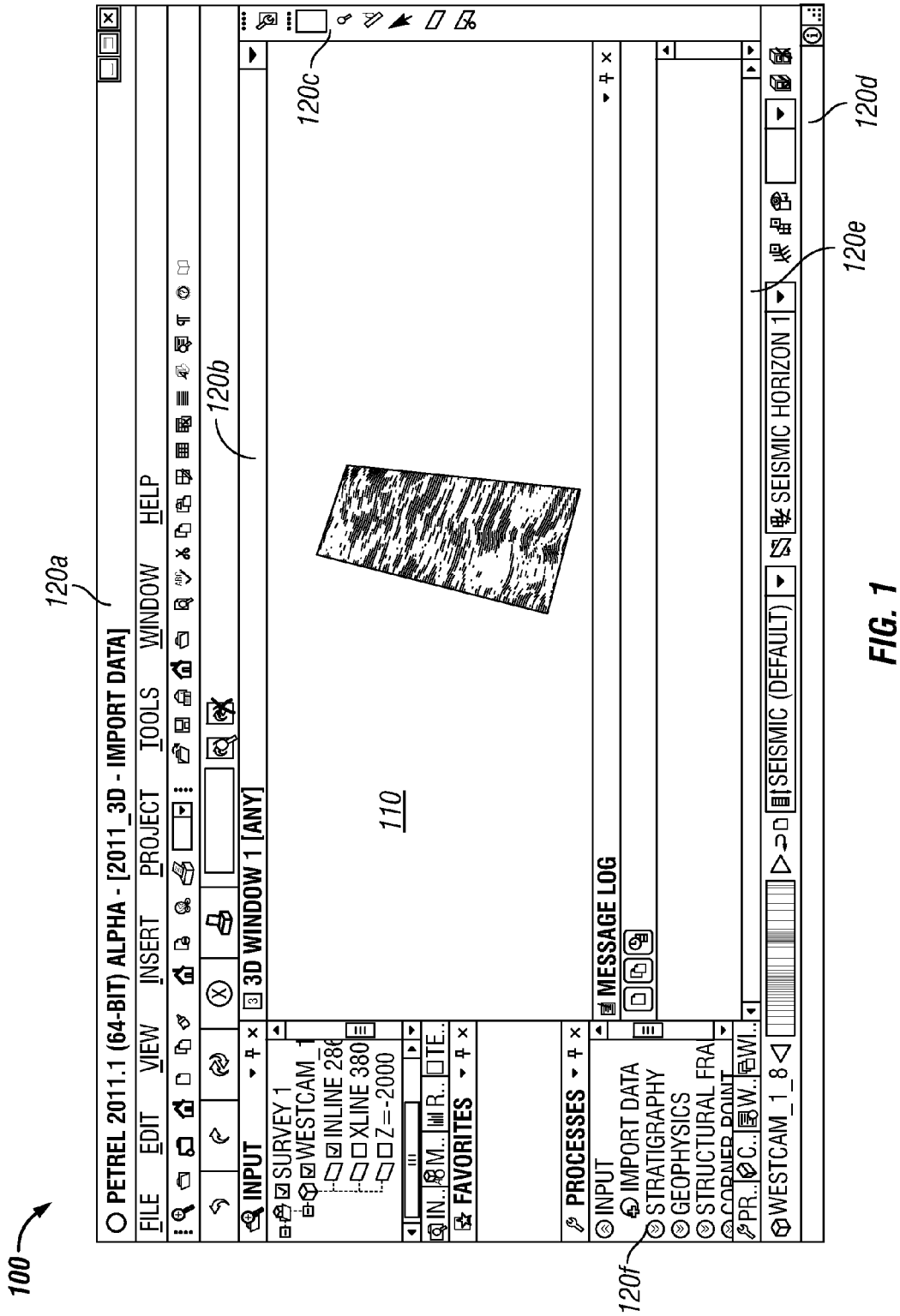
FIG. 1 shows a GUI according to an embodiment of a non-immersive GUI according to prior art.

As discussed above, a G&G application that implements a non-immersive GUI 100 may fail to provide a user with an immersive experience. In contrast, embodiments of the present disclosure may provide an "immersive GUI" that efficiently utilizes screen estate and focuses on providing GUI elements that are relevant to an operation that a user wants to perform. An advantage of this is that a user of an immersive GUI according to the present disclosure will be less distracted by GUI elements which may be less relevant in view of a context related to an operation. As a result, immersive interfaces can be easier, more fun, more productive and less stressful to use than non-immersive interfaces.

In non-immersive G&G interfaces, the user might spend unnecessary time and energy using the support controls. An immersive interface, on the other hand, can improve usability of G&G applications over prior art. For example, in an example embodiment, an immersive interface may enable a user to view, edit and perform operations on G&G data (e.g., seismic, horizon or fault interpretations, structural models, etc.) using at least a substantial portion of the screen estate. Furthermore, the control elements may be designed to prevent blocking a user's view of visualized G&G data (e.g., by varying the transparency of control elements based on a user's activity).

As an example, one or more semi-transparent panels and/or toolbars may be placed on top of the data view. These panels may provide access to operations that may be performed on the data visualized in the data view. The transparency of these panels may decrease when a pointer indicating a position of an input device (e.g., a mouse, a finger, a stylus, or any other input device) hovers above a predetermined area within the panel bounds, and transparency of these panels may increase when the mouse is outside the predetermined area. Additionally, a blurring effect may be applied to one or more GUI elements (e.g., the data view) when the mouse hovers over a panel or toolbar. Furthermore, according to an embodiment, one or more panels may be rendered in a color which blends in with the data view. Other example embodiments will be described below with reference to the Figures.

In the domain of geophysics work, an embodiment of an immersive GUI may provide an at least substantially full-screen view of G&G data along with a toolbar to perform one or more common tasks, such as:

interactive assisted 2D or 3D horizon tracking;
points picking;
computing and manipulating the parameters of stacked volume attributes over the visualized data. When clicking the button for computing volume attributes, another interactive transparent overlay panel will appear on the right part of the screen;
a slider to move between X, Y or general intersections in the visualized seismic data;
a combo box to select the color table of the visualized data;
a combo box to select the active seismic horizon on which interpretation is done;
a slider to compress or decompress the current color table of the data;
a slider to adjust the opacity of some or all of the objects currently visualized;

According to another aspect of an example embodiment, an immersive GUI may be adapted to make certain assumptions and/or decisions about automatically applying operations to data shown in the data view. These assumptions and/or decisions may be based upon information about user activity (e.g., what a user may want in a certain context). For example, when computing a stacked volume attribute (i.e., a plurality of attributes to be applied to a seismic volume), a G&G application implementing an immersive interface might not require a user to select an object that a computation should be applied to. Instead, the G&G application might automatically apply the attribute to the data that is currently visualized. In another example, the G&G application might automatically apply the attribute to data that was last modified by an operation. This can reduce the amount of input needed from the user, and also minimizes repeated user tasks (e.g., repeatedly selecting objects and buttons to apply one or more attributes).

An Example Immersive GUI

Figure 2:
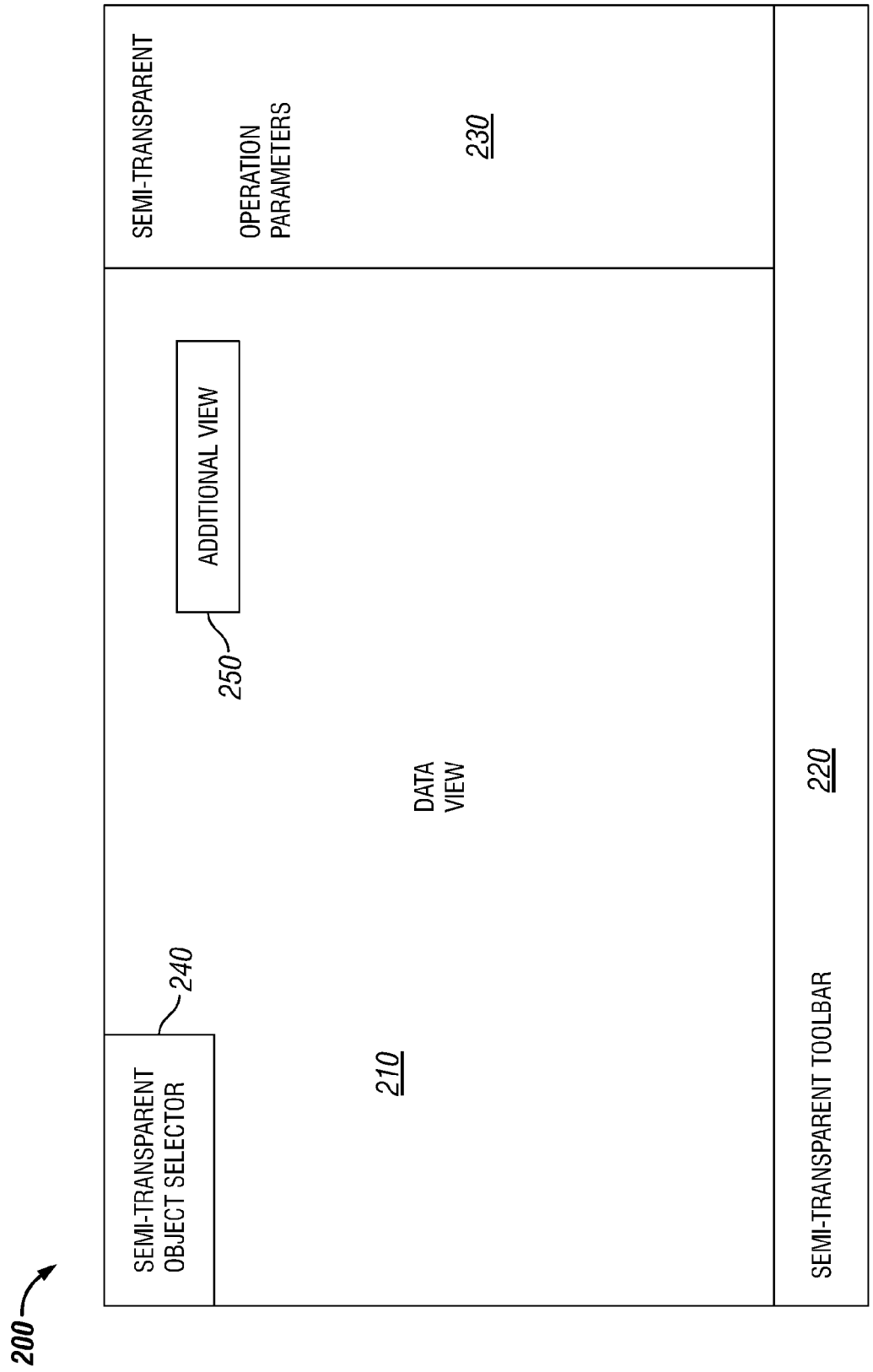
FIG. 2 shows a GUI according to an embodiment of the present disclosure.

FIG. 2 shows an example embodiment of an immersive GUI 200 for a G&G application. The G&G application may operate on any computing device known in the art, including, without limitation, any workstation, laptop, or mobile device (e.g., a phone, a tablet, etc.). Example embodiments of a computing device are described below with respect to FIG. 10.

The GUI may include one or more GUI elements. A GUI element may include a data view 210 which includes at least a substantial portion of the screen space (e.g., the entire screen space). According to an example embodiment, the data view 210 may visualize G&G data (e.g., seismic data). For example, the data view 210 may show a seismic inline and/or crossline view of G&G data.

A GUI element may also include a toolbar 220. The toolbar 220 may be placed at any position within the GUI 200 (e.g., the bottom of the GUI as shown in FIG. 2). According to an embodiment, a transparency characteristic of the toolbar 220 may vary depending on a position of a pointer representing a location of an input device (e.g., mouse pointer, a user's finger, or other input device). For example, the toolbar 220 may be semi-transparent when a pointer is positioned outside the bounds of the toolbar 220. However, when the pointer is positioned within the bounds of the toolbar 220, the transparency of the toolbar 220 may decrease over a pre-determined time interval (e.g., approximately one second). Optionally, another interactive visual effect may include blurring at least a portion of one or more GUI elements (e.g., the data view 210) when the pointer is positioned within the bounds of a certain GUI element (e.g., the toolbar 220).

When a user selects an operation represented on the toolbar 220 that involves further interaction, another GUI element may appear on a portion of the screen (e.g., panel 230 on the right portion of the screen as shown in FIG. 2). The panel 230 may present to the user one or more sliders that are related to one or more operation parameters. In an embodiment, the transparency of the panel 230 may vary depending on a location of a pointer positioned with respect to the bounds of the panel 230 (e.g., decreasing/increasing transparency, blurring at least a portion of one or more GUI elements, etc.). According to an embodiment, when a user adjusts operation parameters, the results may be automatically and instantly applied to the currently-visualized data.

When a user selects a GUI element to perform volume attributes, a panel 230 may appear, and the user may select one or more attributes to compute. Upon user selection of an attribute, the application may automatically apply one or more virtual volume attributes to at least a portion of the data shown in the data view 210 (e.g., a stack of virtual volume attributes). Furthermore, the application may adjust one or more parameters used as inputs to the volume attribute algorithm.

A panel 230 may appear when a user selects a GUI element to perform interactive 2D or 3D horizon tracking. In such an embodiment, the panel 230 may show tracking algorithm parameters which can be interactively adjusted. According to an embodiment, the parameters may include value constraints such as seed confidence, value range, and/or value delta. The parameters may also include wavelet parameters, such as correlation quality (e.g., a slide bar GUI element may be provided to modify the correlation quality), and above, below and length values. According to an example embodiment, when algorithm parameters are modified by a user, changes may be immediately rendered in the data view 210 without further input from a user.

If the data view 210 shows a 3D view, a 2D interpretation view showing the active seismic inline or crossline can be shown along with the 3D graphics view. For example, the 2D view may be a representation of the 3D view, but projected into two dimensions. A user may use these views to interact with a seismic volume. According to an embodiment, the user may provide input (e.g., using left or right arrow keys) to navigate these views of the seismic volume. According to an embodiment, when an immersive GUI is initialized, one or more help GUI elements may be displayed to the user, so as to educate the user as to shortcuts available within the immersive interface (e.g., how to use arrow keys navigate a visualized data model), thereby improving the immersive experience, and reducing the need for constantly presenting visual controls which could block a user's view of visualized data.

A GUI element may include a selector GUI element 240. A selector 240 may appear in any portion of the GUI 200 (e.g., the top-left corner of the GUI as shown in FIG. 2), and may be used to select one or more objects to visualize in the data view 210. According to an embodiment, the transparency of the selector 240 may vary depending on a location of a pointer positioned with respect to the bounds of a selector 240 (e.g., decreasing/increasing transparency, blurring a portion of one or more GUI elements, etc.).

A selector 240 can be used to select one or more objects to visualize. In an embodiment, the selector 240 may be hidden at first and may appear at a certain portion of the GUI 200 (e.g., the top-left corner of the GUI 200) when a user selects a GUI element relating to an object shown in the data view 210. A selector 240 may also be context-sensitive. That is, it may automatically show certain objects, or allow a user to choose certain objects, depending on a context of a user operation (e.g., the current context).

A GUI element may include one or more additional views 250 which appear within the data view 210 (e.g., see example below). An additional view 250 may vary a transparency characteristic depending on a location of a pointer positioned with respect to the bounds of the additional view 250 (e.g., decreasing/increasing transparency, blurring a portion of GUI elements, etc.).

Figure 3:
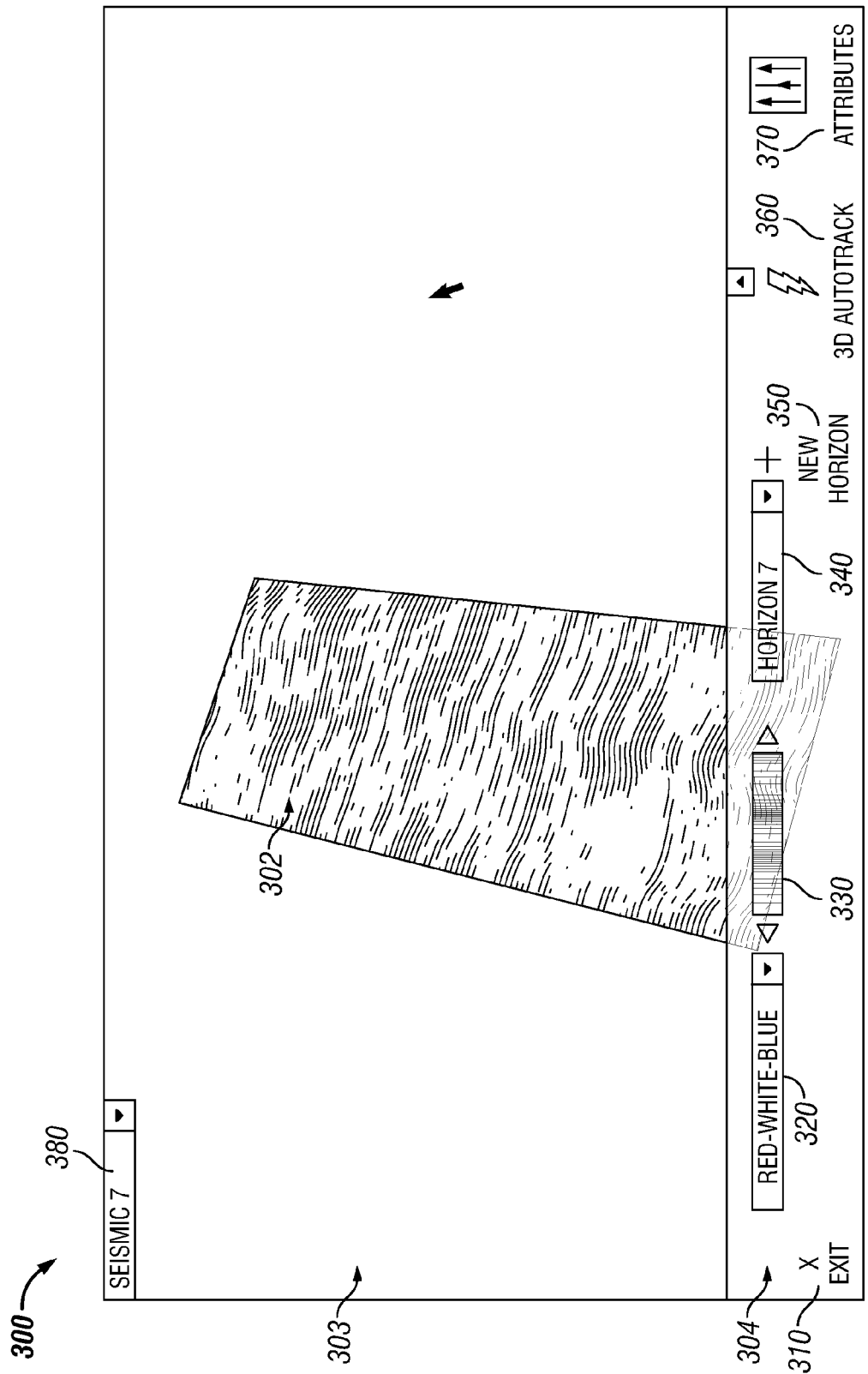
FIG. 3 shows a GUI according to an embodiment of the present disclosure.

The GUI 200 can be used to execute a seismic interpretation workflow. The toolbar 220 may include one or more GUI elements (e.g., buttons) that enable a user to execute one or more operations on the data shown in a data view 210. In an example embodiment, the toolbar 220 may include one or more of the following GUI elements:

a GUI element (e.g., a button) to perform interactive 2D or 3D horizon tracking;
a GUI element (e.g., a button) to perform points picking;
a GUI element (e.g., a button) for interactively computing and manipulating parameters of stacked volume attributes over the visualized data (e.g., when the GUI element is clicked for computing volume attributes, an interactive transparent overlay panel may appear on the screen in a manner similar to that described with respect to panel 230);
a GUI element (e.g., a slider) to move between X, Y or general intersections in the visualized seismic data;
a GUI element (e.g., a combo box) to select the color table of the visualized data;
a GUI element (e.g., a combo box) to select the active seismic horizon on which interpretation is done;
a GUI element (e.g., a slider with two knobs) to compress or decompress the current color table of the data;
a GUI element (e.g., a slider) to adjust the opacity of some or all of the objects visualized in a data view 210;
Toolbar FIG. 3 shows an example embodiment of an immersive GUI 300. A 3D view of a seismic cross-section 302 may be shown in a data view 303 GUI element. In another embodiment, a 2D view of G&G data may be shown in data view 303. In yet another embodiment, both a 2D view and a 3D view of G&G data may be shown in data view 303.

GUI 300 may also include a toolbar GUI element 304 (e.g., along the bottom of GUI 300 as shown in FIG. 3). The transparency of toolbar 304 may vary depending on a location of a pointer positioned with respect to the bounds of the toolbar 304 (e.g. as described above with respect to toolbar 220 in FIG. 2). Toolbar 304 may include an exit button GUI element 310 that enables a user to exit the immersive GUI 300. In addition, toolbar 304 may also include a combo box GUI element 320 that enables a user to select a color scheme to be applied to at least a portion of data shown in data view 303. When a scheme is selected, the scheme may be instantly applied to the visualized data.

A compression slider GUI element 330 may be included on the toolbar 304 and may be used to compress/decompress a color scheme. According to an embodiment, the track of the slider 330 may display the current color table. Input from the user to the slider 330 may be instantly applied to at least a portion of the data shown in the data view 303. A similar slider could be present in the toolbar 304 for controlling other visual settings, such as an opacity characteristic of a visualized object.

Toolbar 304 may further include a combo box GUI element 340 that may be used to select a horizon to use for automatic horizon tracking. In an embodiment, new horizons can also be created by pressing the 'New Horizon' GUI element 350.

The toolbar 304 may also include an 'Autotrack' GUI element 360 (e.g., a button), which a user may select to perform an autotrack operation. In an example embodiment, upon selection of the 'Autotrack' GUI element, autotrack mode may be selected and the user can pick seed points related to the data in the data view 303. The selected seed points may be used as input to an automatic horizon tracking algorithm. By pressing and holding the mouse button for a short interval of time, the user can change the autotracking mode from the default 3D mode to a different mode (e.g., a 2D mode). See FIG. 4 for an example.

The toolbar 304 may also include an 'Attributes' GUI element 370 (e.g., a button). According to an example embodiment, when the 'Attributes' button is selected, a panel may appear (e.g., the panel may behave similarly to panel 230 described above), and the panel may allow the user to apply computations over the seismic volume. See FIG. 5 for an example.

The GUI 300 may include a selector GUI element 380 that enables a user to select one or more objects related to a seismic volume. According to an embodiment, when the selector 380 is selected, a list may appear. The list may display one or more seismic data that the user has loaded, and the user can select one or more seismic data objects to work on. This selector 380 may or may not be present at any given time, depending on a context and/or application needs.

The foregoing are just some examples of the operations that may be offered by a toolbar 304, and it should be understood that other operations may also be possible.

Autotracking

Figure 4:
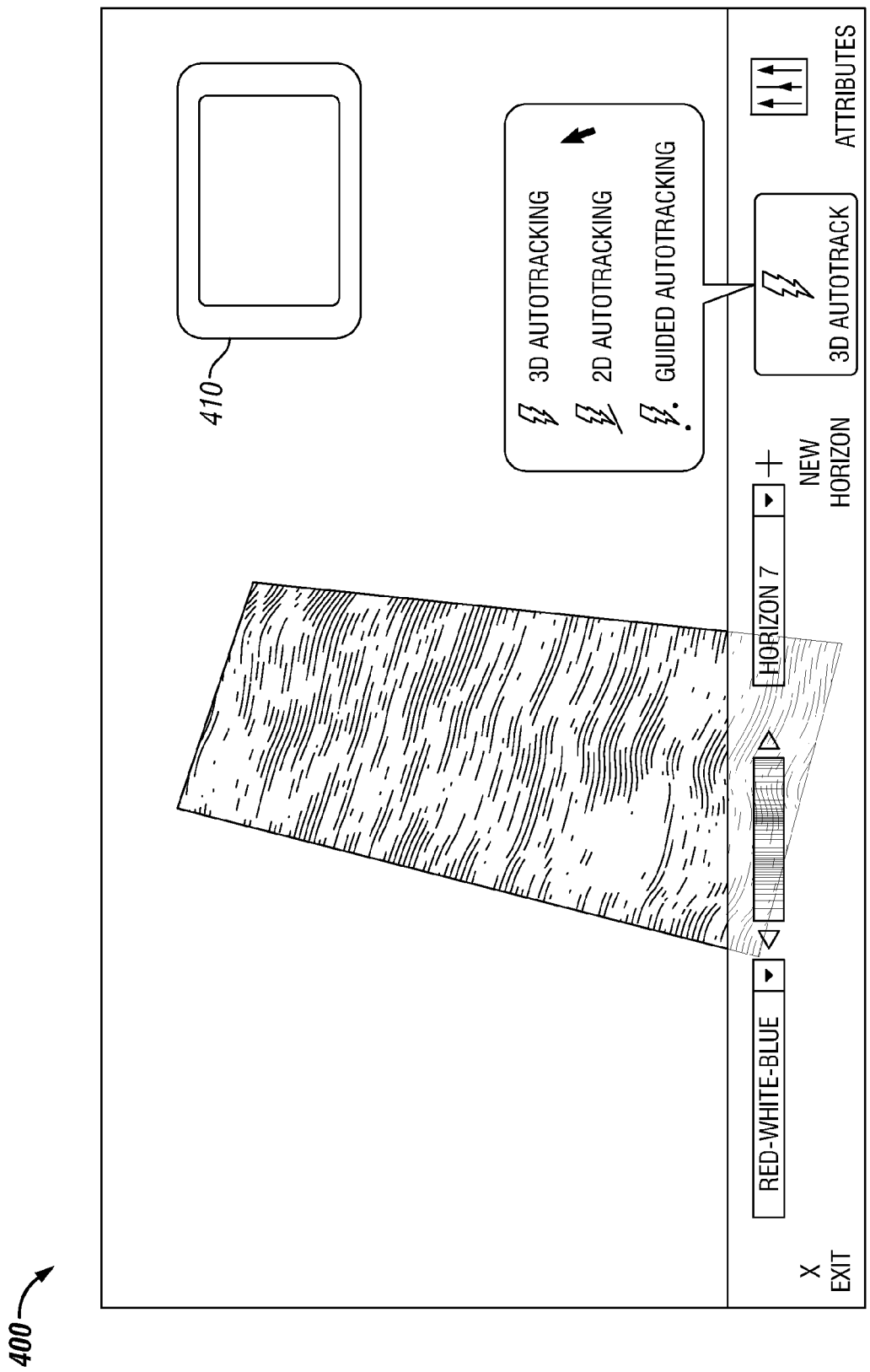
FIG. 4 shows a GUI according to an embodiment of the present disclosure.

FIG. 4 shows an example of a GUI 400 that may be used to implement an 'Autotrack' operation. According to an embodiment, a user may initiate 'Autotrack' functionality via an input device by holding a selection action for a pre-determined interval of time when hovering over a GUI element (e.g., clicking and holding a mouse button, holding a user's finger, stylus, or other input device over the 'Autotrack' GUI element 360 described above in FIG. 3). In response, a list of modes may appear. A user may then select an active autotracking mode from the list. For example, when 'Autotrack' is selected, a 2D interpretation view 410 may automatically appear. According to another example embodiment, the 'Autotrack' GUI element 360 may present a user with a plurality of selectable autotrack modes, so that a user may quickly switch between the various autotrack modes. Autotrack modes may include one or more of: (a) 3D—pick one point in the volume and autotrack the entire 3D surface; (b) 2D—pick a point and autotrack along a cross/inline; (c) 2D seeded—pick a set of points along a cross/inline and then interpolate between the points; and (d) manual—pick all lines manually.

Attributes

Figure 5:
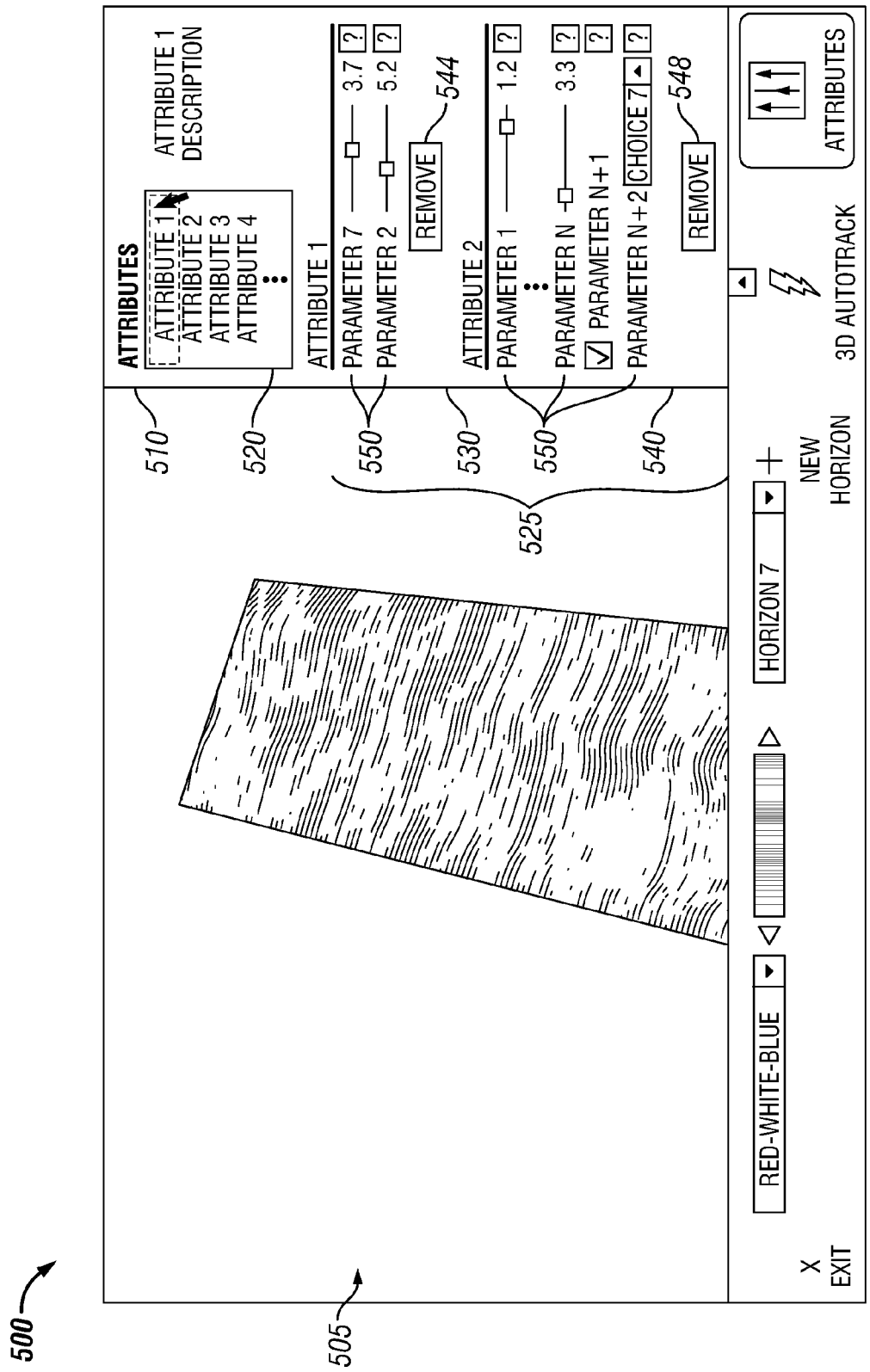
FIG. 5 shows a GUI according to an embodiment of the present disclosure.

FIG. 5 shows an example GUI 500 that may appear when a user selects an 'Attributes' GUI element (e.g., the 'Attributes' GUI button 370 described above in FIG. 3). According to an embodiment, a panel 510 may appear. The panel 510 may include an attribute list 520. The user may select one or more attributes from the attribute list 520. When a pointer hovers over an attribute in the attribute list, a description field next to the list may be immediately updated to show a description of the current attribute. Furthermore, when an attribute is selected, the attribute may be immediately applied to data shown in the data view 505.

According to an embodiment, when an attribute is selected from the attribute list 520, the selected attribute may be added to an "attribute stack" 525 that includes one or more previously selected attributes. The attribute stack 525 may be visualized in one or more panels 530, 540. FIG. 5 shows an attribute stack that includes two attributes, but other numbers of attributes are also possible. A user can remove attributes from the attribute stack 525 by pressing a 'Remove' button 544, 548 associated with an attribute (e.g., located at the bottom of each attribute parameter control, as shown in FIG. 5).

One or more parameter controls 550 related to an attribute in an attribute stack 525 may appear in the panels 530, 540. The parameter controls 550 can display one or more parameters, such as, for example, numerical parameters, Boolean parameters, or multiple choice parameters. Some example parameter controls 550 are shown in the panels 530, 540, however parameter controls are possible. According to an embodiment, when a user changes a parameter by modifying a parameter control 550, a related attribute may be immediately recomputed and an updated result may be applied to at least a portion of the data view 505. A help tip (denoted by the "question mark" icons shown in panels 530,540) may show information about a parameter whenever a user hovers over its bounds.

Search

Figure 6:
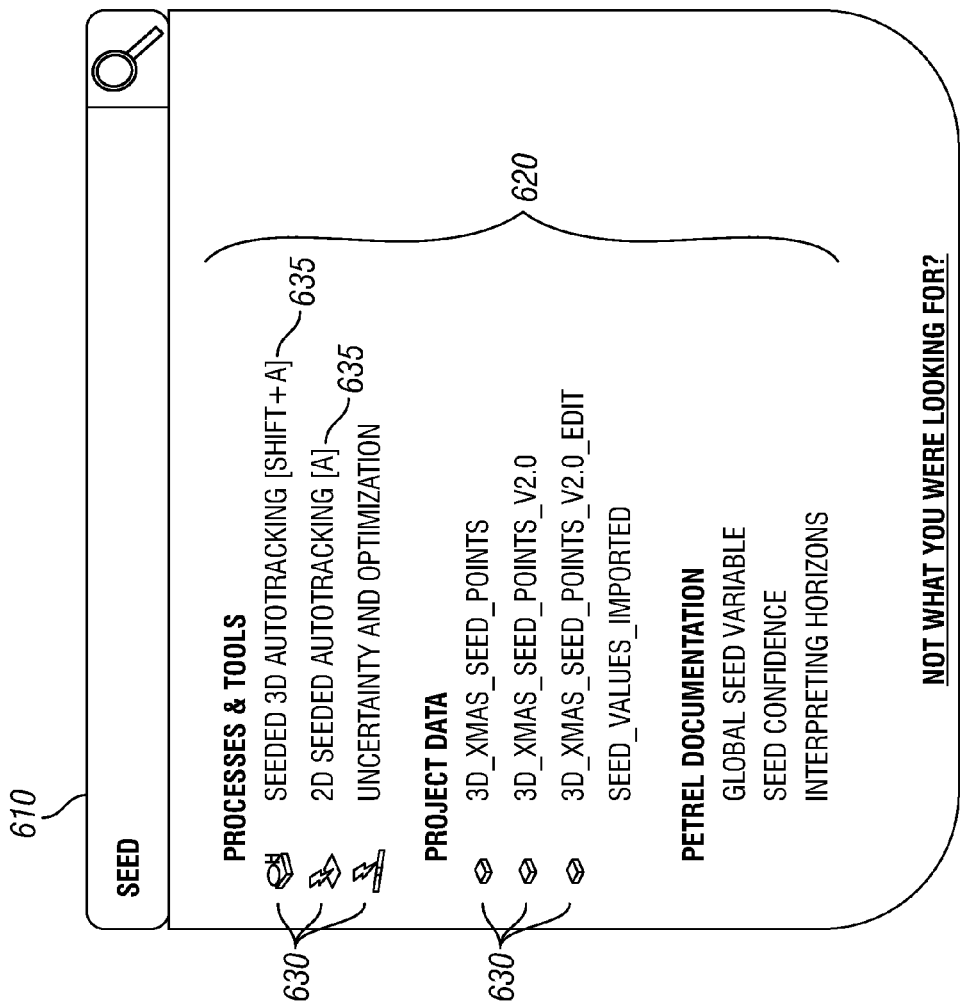
FIG. 6 shows a search bar GUI element according to an embodiment of the present disclosure.

FIG. 6 shows an example embodiment of a search GUI element. The search GUI element may include a search bar 610 that can be used in an immersive GUI to decrease the amount of user input involved in operating G&G software. The search bar 610 could also be used to locate local project data or enable a user to locate, execute, and/or activate an object. Another aspect of the search bar 610 is that it can aid learning by displaying one or more shortcut keys that may be used to execute various G&G software commands. Yet another aspect of the search bar 610, is that it can simplify an immersive GUI. That is, a user could access GUI commands via searching for a command, rather than constantly presenting GUI controls and commands to a user as is done in prior art.

According to an embodiment of an immersive GUI, a "search" GUI element (e.g., a search bar 610 as described herein) may be activated by a user (e.g., via a keyboard shortcut). In an embodiment, to minimize mouse movement, the search bar 610 may appear in close proximity to a cursor when activated with mouse input. Alternatively, if the search bar 610 is activated from a keyboard (e.g., by pressing a single key, such as the space bar, or "X"), it may show up in a predetermined location in a GUI (e.g., directly under the current position of a cursor, or in the upper right corner of an active window), so as to maintain focus on the ongoing work or already opened Petrel windows. Another method of activating the search bar 610 may include recognition of a voice command.

Once the search bar 610 is activated, a user may enter one or more search terms to search for results described above (e.g., commands, processes, tools, modes, objects, documentation, help content, project content, etc.). Technologies such as auto-complete and object indexing may be used to quickly produce search results.

A search bar 610 may be adapted to prompt a user with real-time-suggestions as characters are typed. Furthermore, the search bar 610 may include a textbox and a search icon. According to an embodiment, there may be no need to click a "Search" button to initiate the results search, as the results 620 may be populated on the fly based on partial user input. In an embodiment, as soon as the user enters characters, the search bar 610 may expand vertically into a list of results 620.

These results 620 may be categorized based on the type of category each result belongs to. Each object displayed in the list may also include an icon 630 representing the object and/or a shortcut key reminder 635. If no matches are found, then the search bar 610 may display a message to the user indicating that no search results were found (e.g., "No Results"). Objects in the results list 620 may be selected by the user, thereby executing the selected action/object.

A search bar 610 may also be extensible to receive search results from other components. As an example, an application or plug-in may be adapted to provide results from its documentation to the search bar 610 based on the user's input.

Prior art examples of command searches do not take into consideration the context in which the user is currently working, and do not discriminate between different types of commands. In contrast, in an example embodiment of the present disclosure, if the user is working in a geophysics context, a search bar 610 according to an embodiment of the present disclosure may prioritize results related to geophysics.

A search bar 610 of the present disclosure may be configured to be aware of context. A context may include information about a current domain, current operation, current project, current command, etc. For example, a search bar 610 may maintain a list of commands that a user typically uses in a certain context, so that results which are more frequently used can appear higher up in the results list 620. A context may also be used to provide search results that are related to a context (e.g., either the data set the user is currently working on or a user's current step in a G&G workflow). For example, if a user is working on a data set where he/she has performed an attribute computation using a particular attribute, the search results may include other seismic attributes. This can help the user learn how to use the software. It can also monitor what the user actually does and prioritize search results which may suggest the next steps for the user higher up in the results list 620.

A criticism against prior art user interfaces is that it can be difficult to find commands within a GUI (e.g., a MICROSOFT ® "Ribbon"). An embodiment of a search tool may index one or more interface commands, and display the command differently in the result list 620 based on the type of command. For example, if a result is of the Ribbon Gallery type, a Gallery can be shown when hovering over a Gallery search result. As another example, if the result is a Ribbon multi-option split button, different options can be grouped together into a single search result. An effect is that the search bar 610 may provide a user with access to a plurality of commands available from the Ribbon. Whereas the Ribbon may involve significant mouse usage (e.g., significant mouse clicks and mouse movements) to find a command within a Ribbon, a search bar 610 can reduce both the number of mouse clicks and/or mouse movement, and thereby reduce the time required by a user to try and find a command by navigating within a Ribbon.

In an immersive GUI, a search tool may be used to help a user efficiently find commands. In prior art, commands are constantly visible to a user and he/she must navigate the GUI to locate a command. In contrast, a search bar 610 may allow a user to quickly access any command available in a GUI by simply searching for the command. Accordingly, in an example embodiment of the present disclosure, various commands do not need to be constantly visualized as GUI elements to a user. An immersive GUI may be streamlined to offer a user easy access to frequently used commands, while at the same time providing a user with a way to access additional functionality that may not be visible as a GUI element of an immersive GUI. Accordingly, a search bar 610 provides a way to access a larger portion of the functionality, while retaining focus on the frequently used features.

Figure 7A:
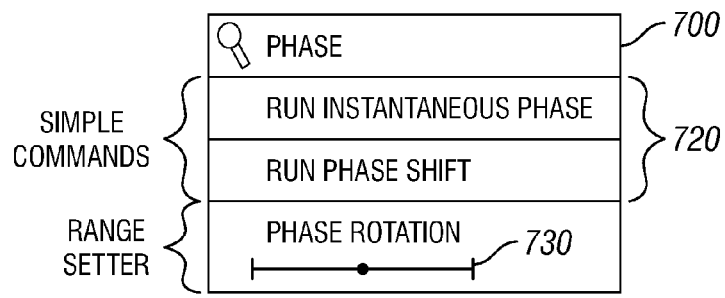
FIGS. 7a-7c shows various embodiments of a search bar GUI element according to the present disclosure.
Figure 7B:
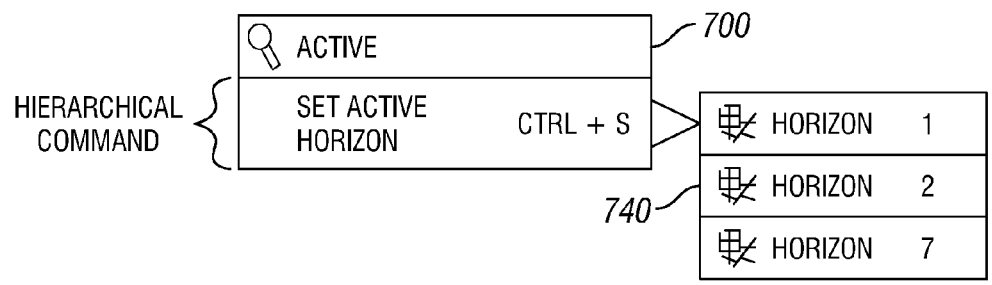
Figure 7C:
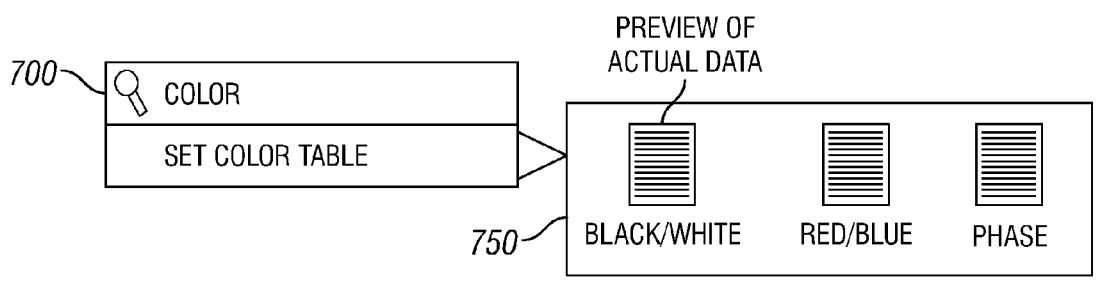

FIGS. 7a-7c show several example operations of a search bar 700. As shown in FIG. 7a, if search results include a command that needs no further input from a user to execute (e.g., one of the simple commands 720), then a user may simply select the command from the search results to execute the operation. However, it is possible to have more complex search results. For example, certain operations could involve further user input as to one or more parameters related to the operation. In FIG. 7a, the "phase rotation" operation shown in the search results allows a user to further modify certain parameters of the operation using a slider GUI element 730. In another example, as shown in FIG. 7b, a search bar 700 could be adapted so that the search results show a hierarchical list 740 of potentially selectable objects or selectable modes. In yet another embodiment, the search results could be a gallery of images, as shown in FIG. 7c. As an example, a search for "color table" could provide a search result "set color table," and include a plurality of previews 750 of the data using different color tables.

Light Control

Figure 8:
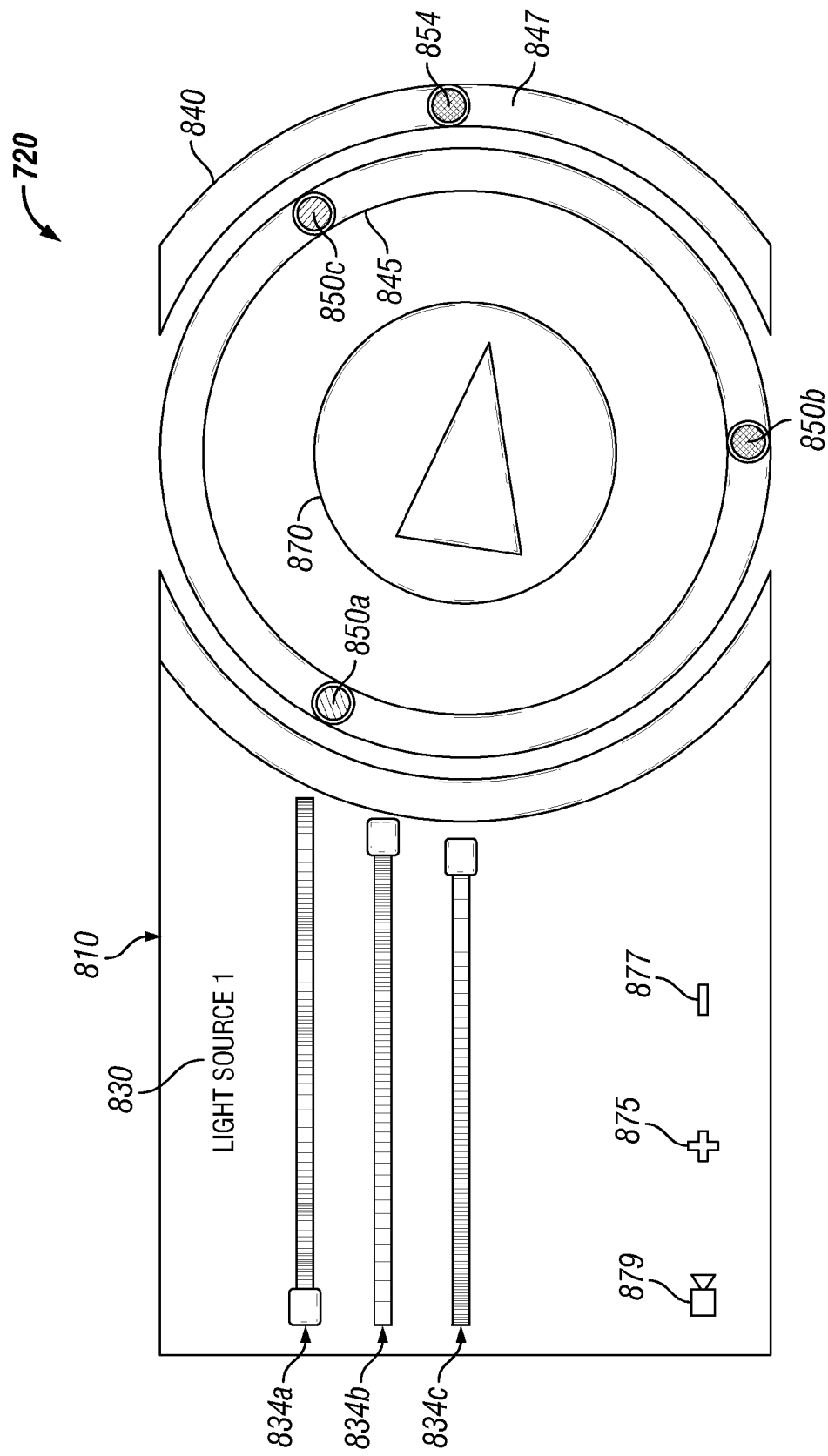
FIG. 8 shows a light control according to an embodiment of the present disclosure.

FIG. 8 shows an example embodiment of a GUI element that comprises a light controller 810. The light controller 810 may enable a user to manipulate one or more light sources with respect to visualized G&G data. A light source may be positioned anywhere with respect to the visualized G&G data (e.g., above the G&G data, at an angle with respect to the G&G data, etc.).

In an example embodiment, a light controller 810 may include a label 830 that displays the name of a selected light source, one or more slider GUI elements 834a-c, and a ring control GUI element 840. The ring control GUI element 840 may include an inner ring control GUI element 845 and an outer ring control GUI element 847.

Slider 834a may be used to choose a color of a selected light source, slider 834b may be used to set a saturation of the color of a selected light source (e.g., moving slider 834b to the left may cause the color to become more washed out and moving the slider 834b to the right may cause the color to become more contrasted), and slider 834c may be used to set a value of the color of a selected light source. Together, sliders 834a-c may determine a Hue Saturation Value (HSV) of a selected light source.

The inner circular control 845 may include one or more dot control GUI elements 850a-c. Each of the dot controls 850a-c represents a different light source. In FIG. 8, 850a-c represent three different light sources, however any number of light sources may be represented by dot controls in the inner circular control 845. In an embodiment, the dot controls 850a-c may be colored to match the color of a selected light source, so that the dot controls 850a-c may be distinguished from each other. The dot controls 850a-c may be used to control a direction of the light source. In an example operation, a user may move any dot control 850a-c to another position within the inner circular control 845 in order to change the direction of the selected light source. Dot control 854 in outer ring control 847 may be used to modify an elevation of a currently selected light. For example, once a user has selected a light source by selecting a dot control 850a-c, he/she may move dot control 854 to various positions within the outer circular control 847 to control the elevation of the selected light source.

In an embodiment, a currently-selected dot control 850a may be denoted by a white ring (or any other colored ring) around the dot control 850a. Likewise, non-selected dot controls 850b-c may be indicated using a black ring (or any other colored ring) around the dot control 850b-c. According to an example operation, if a dot control 850 is currently selected and the dot control is clicked, then the corresponding light source may be toggled between on and off states. A light source which is off may be denoted by black filling (or any other colored filling) of the corresponding dot control 850a-c, and a light source which is on may cause the corresponding dot control 850a-c to be filled with a color of the light source.

An example light controller 810 may include a plus button GUI element 875 and a minus button GUI element 877. The plus button 875 may be used to add a light source, and thereby add a dot control 850a-c to the inner circular control 845. The minus button 877 may be used to remove a light source (e.g., a selected light source). A light control 810 may also include a camera button 879 that animates one or more light sources (e.g., all light sources). In an example embodiment, the one or more light sources may rotate through one or more predetermined rates and/or angles. An example light controller 810 may include a rate control that allows a user to speed up, slow down, or stop the rate of rotation through the predetermined rates and/or angles.

An example light controller 810 may be normally semi-transparent, and may become more opaque when a pointer is located within the bounds of the light controller. According to an example operation of the light controller 810, a minimized version of the light controller 810 may be shown when a pointer is located outside the bounds of the light controller. A minimized version of the light controller 810 might not include the label 830, the sliders 834a-c, the camera 879, and the plus and minus buttons 875, 877 (other combinations of GUI elements are also possible). Likewise, a non-minimized version of the light controller 810 might be displayed when a pointer is located within the bounds of the light controller.

According to an example embodiment, keyboard shortcuts may be mapped to various operations of a light controller 810. For example, keyboard shortcuts may allow a user to cycle through one or more light sources, adjust azimuth and/or elevation of a selected light, as well as adjust a speed of animation (e.g., to speed up, slow down, or stop the rate of rotation through one or more predetermined rates and/or angles with respect to one or more light sources).

Figure 9:
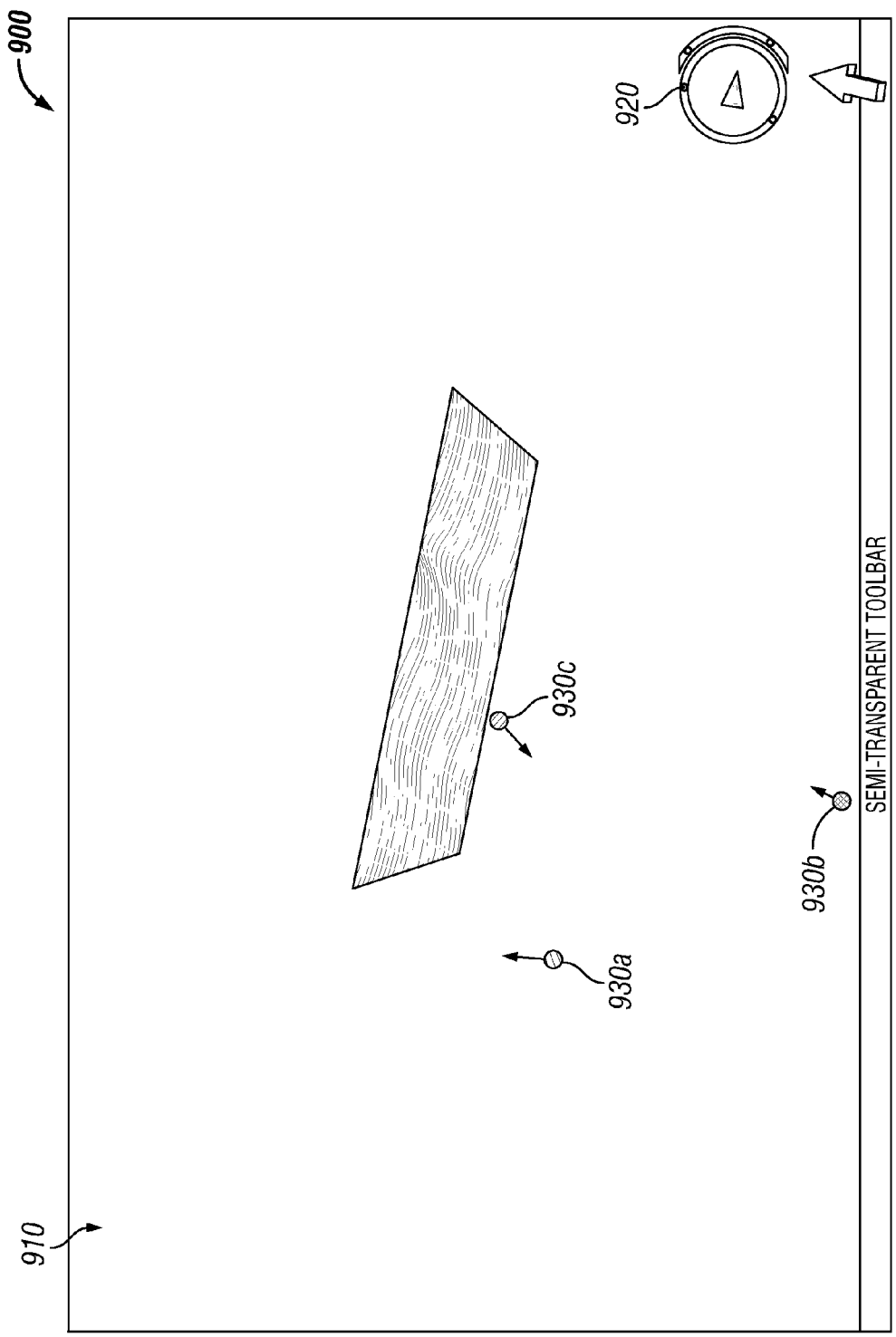
FIG. 9 shows a GUI according to an embodiment of the present disclosure.

FIG. 9 shows an example embodiment of an immersive GUI 900. The immersive GUI 900 includes a data view GUI element 910, a light controller GUI element 920, and a plurality of light source GUI elements 930a-c. The light controller 920 may be similar to the light controller 810 described with respect to FIG. 8, and may operate similarly as well.

In an example embodiment, lines may be rendered to extend from a light source 930a-c to visualize a direction of the light rays. Another feature may handle overlapping controls representing the light sources 930a-c, by spatially separating them when a pointer is located nearby. In an immersive GUI 900, an input device may be used to move a camera in order to adjust a view of the data view 910. The input device may also be used to select and relocate one or more objects visualized in the data view 910.

Computer System for Oilfield Application System

Figure 10:
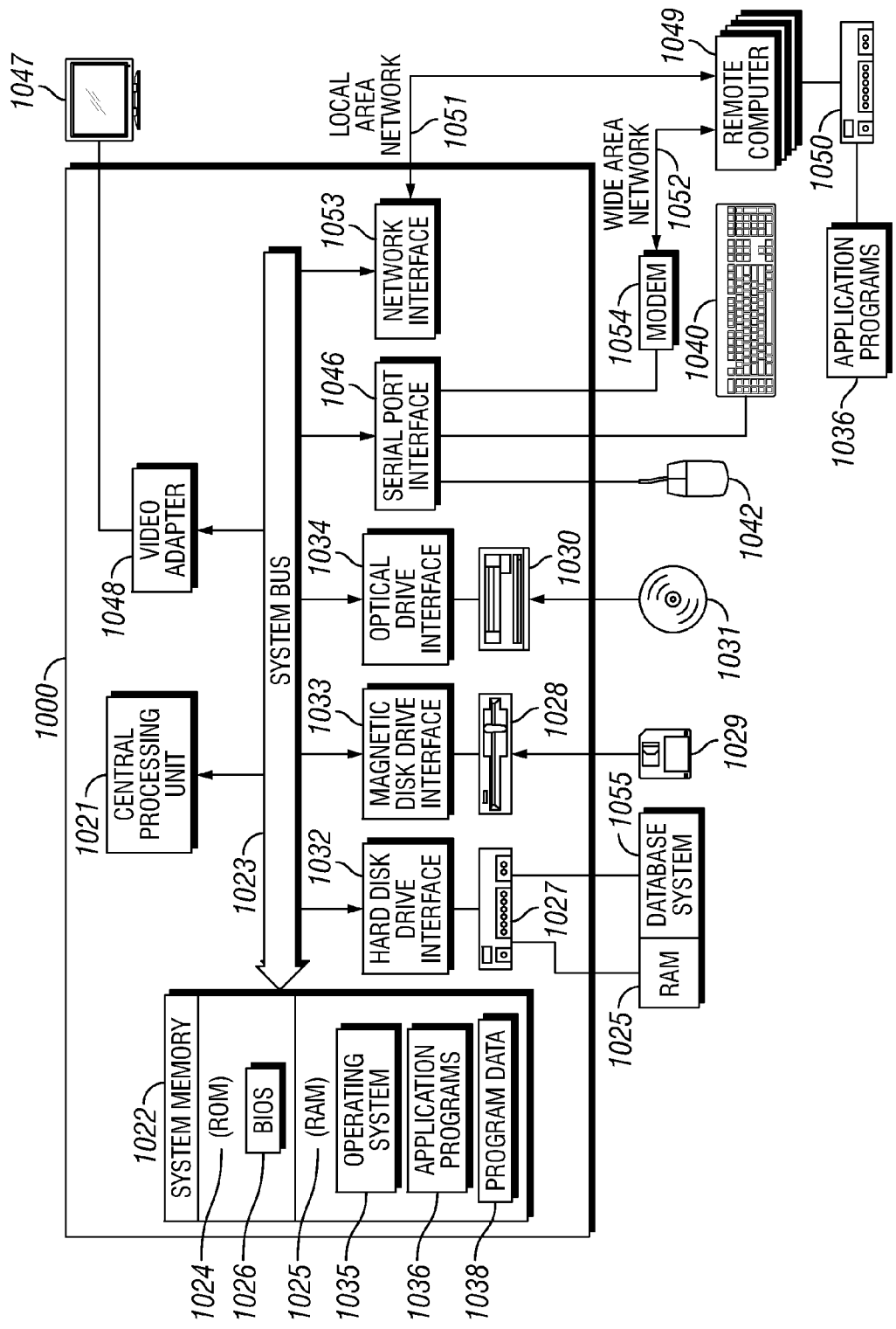
FIG. 10 shows a computer system into which implementations of various technologies and techniques described herein.

FIG. 10 illustrates a computer system 1000 into which implementations of various technologies and techniques described herein may be implemented. In one implementation, computing system 1000 may be a conventional workstation or a server computer, but it should be noted that other computer system configurations may be used.

The computing system 1000 may include a central processing unit (CPU) 1021, a system memory 1022 and a system bus 1023 that couples various system components including the system memory 1022 to the CPU 1021. Although one CPU is illustrated in FIG. 10, it should be understood that in some implementations the computing system 1000 may include more than one CPU. The system bus 1023 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1022 may include a read-only memory (ROM) 1024 and a random access memory (RAM) 1025. A basic input/output system (BIOS) 1026, containing the basic routines that help transfer information between elements within the computing system 1000, such as during start-up, may be stored in the ROM 1024.

The computing system 1000 may further include a hard disk drive 1027 for reading from and writing to a hard disk, a magnetic disk drive 1028 for reading from and writing to a removable magnetic disk 1029, and an optical disk drive 1030 for reading from and writing to a removable optical disk 1031, such as a CD ROM or other optical media. The hard disk drive 1027, the magnetic disk drive 1028, and the optical disk drive 1030 may be connected to the system bus 1023 by a hard disk drive interface 1032, a magnetic disk drive interface 1033, and an optical drive interface 1034, respectively. The drives and their associated computer-readable media may provide nonvolatile storage of computer-readable instructions, data structures, program modules and other data for the computing system 1000.

Although the computing system 1000 is described herein as having a hard disk, a removable magnetic disk 1029 and a removable optical disk 1031, it should be appreciated by those skilled in the art that the computing system 1000 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1000. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 1027, magnetic disk 1029, optical disk 1031, ROM 1024 or RAM 1025, including an operating system 1035, one or more application programs 1036, program data 1038, and a database system 1055. The operating system 1035 may be any suitable operating system that may control the operation of a networked personal or server computer, such as Windows® XP, Mac OS® X, Unix-variants (e.g., Linux® and BSD®), and the like. In one implementation, plug-in manager 420, oilfield application 410, the plug-in quality application and the plug-in distribution application described in FIGS. 4-9 in the paragraphs above may be stored as application programs 1036 in FIG. 10.

A user may enter commands and information into the computing system 1000 through input devices such as a keyboard 1040 and pointing device 1042. Other input devices may include a microphone, joystick, game pad, satellite dish, scanner, or the like. These and other input devices may be connected to the CPU 1021 through a serial port interface 1046 coupled to system bus 1023, but may be connected by other interfaces, such as a parallel port, game port or a universal serial bus (USB). A monitor 1047 or other type of display device may also be connected to system bus 1023 via an interface, such as a video adapter 1048. In addition to the monitor 1047, the computing system 1000 may further include other peripheral output devices such as speakers and printers.

Further, the computing system 1000 may operate in a networked environment using logical connections to one or more remote computers 1049. The logical connections may be any connection that is commonplace in offices, enterprise-wide computer networks, intranets, and the Internet, such as local area network (LAN) 1051 and a wide area network (WAN) 1052. The remote computers 1049 may each include application programs 1036 similar to that as described above. In one implementation, the plug-in quality application (i.e., performing method 500) stored in plug-in quality center 460 may be stored as application programs 1036 in system memory 1022. Similarly, the plug-in distribution application (i.e., performing method 600) stored in plug-in distribution center 470 may be stored as application programs 1036 in remote computers 1049.

When using a LAN networking environment, the computing system 1000 may be connected to the local network 1051 through a network interface or adapter 1053. When used in a WAN networking environment, the computing system 1000 may include a modem 1054, wireless router or other means for establishing communication over a wide area network 1052, such as the Internet. The modem 1054, which may be internal or external, may be connected to the system bus 1023 via the serial port interface 1046. In a networked environment, program modules depicted relative to the computing system 1000, or portions thereof, may be stored in a remote memory storage device 1050. It will be appreciated that the network connections shown are and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method of providing a graphical user interface (GUI) for interacting with at least one of geology data and geophysics data (G&G data), the method comprising:

displaying a view of G&G data, wherein the view of the G&G data occupies at least a substantial portion of a display of the GUI;

displaying a first GUI element in the display, wherein transparency of the first GUI element varies depending on a location of a representation of an input device with respect to the first GUI element;

determining a first context comprising an input from a user;

determining a second context of the view of the G&G data, comprising at least one of a type of a G&G workflow being performed on the G&G data, a type of the G&G data, an operation being or to be performed using the G&G data, or a current command received from the user; and displaying a second GUI element in the display, wherein the second GUI element is activated and a location of the second GUI element is customized based on the first context, wherein the second GUI element comprises a search GUI element, the search GUI element being adapted to perform a search of at least one of: a plurality of commands, a plurality of G&G data objects, or documentation, and wherein the search GUI element is adapted to prioritize a search result from the search based upon the second context.

2. The method of claim 1, wherein the search result comprises at least one of:
   a first command that is executed upon selection;
   a third GUI element for modifying a parameter of a second command; or
   an image representing a result of executing a third command.

3. The method of claim 1, wherein the first element comprises a light controller adapted to control a light source with respect to the G&G data.

4. The method of claim 1, further comprising displaying a third GUI element comprising a list of attribute calculations, and applying a selected attribute calculation from the list of the attribute calculations to at least a portion of the G&G data immediately after a user selects the selected attribute calculation.

5. The method of claim 1, further comprising displaying a third GUI element for modifying a parameter in response to selection of an attribute to be applied to the G&G data, and applying the parameter to at least a portion of the G&G data immediately in response to user input to the third GUI element.

6. The method of claim 1, further comprising:
   adding a first attribute selected by the user to an attribute stack comprising a second attribute; and
   applying the first and second attributes to at least a portion of the G&G data immediately after the user selects the first attribute.

7. The method of claim 1, wherein the view of G&G data comprises a three-dimensional view of the G&G data and a two-dimensional view of the G&G data, and further comprising:
   displaying a third GUI element for tracking a horizon related to the G&G data; and
   switching focus between the three-dimensional view and the two-dimensional view based on a user input while displaying both of the three-dimensional view and the two-dimensional view.

8. The method of claim 1, wherein transparency of the first GUI element decreases when the location of the input device is within a boundary of the first element, and transparency of the first GUI element increases when the location of the input is outside the boundary of the first element.

9. The method of claim 1, wherein the G&G workflow is selected from the group consisting of autotracking one or more geologic features and displaying one or more seismic attributes.

10. The method of claim 1, wherein the view of the G&G data occupies the entire display, the first GUI element and the second GUI element being overlaid on the view of the G&G data.

11. The method of claim 1, wherein the input from the user comprises a position of a mouse cursor, and wherein the location of the second GUI element is customized based on the position of the mouse cursor.

12. The method of claim 1, wherein the search GUI element is further adapted to prioritize the search result based upon frequently used commands associated with the second context.

13. One or more non-transitory computer-readable media, the computer-readable media comprising computer-executable instructions to instruct a computing device to perform a method, the method comprising:
   displaying a graphical user interface (GUI) for interacting with at least one of geology data and geophysics data, wherein the GUI comprises a view of geology and geophysics (G&G) data wherein the view occupies at least a substantial portion of a display of the GUI;
   displaying a first GUI element in the display, wherein transparency of the first GUI element varies depending on a location of a representation of an input device with respect to the first GUI element;
   determining a first context of the view of the G&G data;
   determining a second context of the view of the G&G data, comprising at least one of a type of a G&G workflow being performed on the G&G data, a type of the G&G data, a current operation being performed on the G&G data, or a current command received from a user;
   determining a third context comprising an input from the user;
   displaying a second GUI element in the display, wherein the second GUI is customized based on the first context; and
   displaying a third GUI element adapted to perform a search of at least one of: a plurality of commands, a plurality of G&G data objects, and or documentation, wherein the third GUI element is activated and a location of the third GUI element is customized based on the third context, and wherein the third GUI element prioritizes a search result from the search based upon the second context.

14. The computer-readable media of claim 13, wherein the search result comprises at least one of:
   a first command that is executed upon selection;
   a fourth GUI element for modifying a parameter of a second command; or
   an image representing a result of executing a third command.

15. The computer-readable media of claim 13, wherein the first GUI element comprises a light controller GUI element for controlling a light source with respect to the G&G data.

16. The computer-readable media of claim 13, the method further comprising:
   displaying a fourth GUI element for modifying a parameter in response to selection of an attribute to be applied to the G&G data, and applying the parameter to at least a portion of the G&G data immediately in response to user input to the fourth GUI element.

17. The computer-readable media of claim 13, the method further comprising:
   adding a first attribute selected by the user to an attribute stack comprising a second attribute; and
   applying the first and second attributes to at least a portion of the G&G data immediately after the user selects the first attribute.

18. One or more non-transitory computer-readable media, the computer-readable media comprising computer-executable instructions to instruct a computing device to perform a method, the method comprising:
   displaying a graphical user interface (GUI) for interacting with at least one of geology data and geophysics data, wherein the GUI comprises a view of geology and geophysics (G&G) data, wherein the view occupies at least a substantial portion of a display of the GUI;

displaying a first GUI element, wherein transparency of the first GUI element varies depending on a location of a representation of an input device with respect to the first GUI element;

determining a first context comprising an input from a user;

determining a second context of the view of the G&G data, comprising at least one of a type of a G&G workflow being performed on the G&G data, a type of the G&G data, a current operation being performed on the G&G data, or a current command received from the user; and displaying a second GUI element for searching at least one of: a plurality of commands; a plurality of G&G data objects; or documentation, wherein the second GUI element is activated and a location of the second GUI element is customized based at least partially on the first context and prioritizes a list of search results based upon the second context.

19. The computer-readable media of claim 18, wherein the search result comprises at least one of:

a first command that is executed upon selection;

a third GUI element for modifying a parameter of a second command; or an image representing a result of executing a third command.

20. The computer-readable media of claim 18, the method further comprising:

displaying a third GUI element for controlling a light source with respect to the G&G data.

21. The computer-readable media of claim 18, the method further comprising displaying a third GUI element for modifying a parameter in response to selection of an attribute to be applied to the G&G data, and applying the parameter to at least a portion of the G&G data immediately in response to user input to the third GUI element.

22. The computer-readable media of claim 18, the method further comprising:

adding a first attribute selected by the user to an attribute stack comprising a second attribute; and applying the first and second attributes to at least a portion of the G&G data immediately after a user selects the first attribute.

* * * * *